United States Patent
Sudolsky et al.

(10) Patent No.: US 8,849,475 B1
(45) Date of Patent: Sep. 30, 2014

(54) SYSTEMS AND METHOD FOR MANAGING SENSORS IN A VEHICLE

(75) Inventors: Michael D. Sudolsky, Huntington Beach, CA (US); Kirby Keller, Chesterfield, MO (US); Bradley J. Mitchell, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 139 days.

(21) Appl. No.: 13/439,162

(22) Filed: Apr. 4, 2012

(51) Int. Cl.
*G08B 21/00* (2006.01)
*G05D 1/00* (2006.01)

(52) U.S. Cl.
USPC .................................. 701/3; 701/2; 701/29.4

(58) Field of Classification Search
USPC ................ 701/3, 2, 29.4; 702/188; 244/129.5
See application file for complete search history.

(56) References Cited

U.S. PATENT DOCUMENTS

| | | | | |
|---|---|---|---|---|
| 4,115,754 A * | 9/1978 | Duzich | ........................ | 340/971 |
| 5,480,109 A * | 1/1996 | Klein et al. | ................ | 244/129.5 |
| 6,009,356 A * | 12/1999 | Monroe | ......................... | 701/14 |
| 6,529,620 B2 * | 3/2003 | Thompson | .................... | 382/141 |
| 6,941,204 B2 * | 9/2005 | Halm et al. | .................. | 701/29.4 |
| 7,027,953 B2 | 4/2006 | Klein | | |
| 7,091,854 B1 * | 8/2006 | Miao | ........................ | 340/539.26 |
| 7,231,180 B2 | 6/2007 | Benson et al. | | |
| 7,581,434 B1 | 9/2009 | Discenzo et al. | | |
| 2003/0191564 A1 * | 10/2003 | Haugse et al. | .................. | 701/29 |
| 2004/0078170 A1 * | 4/2004 | Di Marzio | .................... | 702/188 |
| 2007/0103289 A1 * | 5/2007 | Dagci | .......................... | 340/521 |
| 2009/0216398 A1 * | 8/2009 | Lynch et al. | .................... | 701/30 |
| 2009/0240604 A1 | 9/2009 | Thurston et al. | | |
| 2011/0167024 A1 | 7/2011 | Maldonado Diaz et al. | | |

* cited by examiner

*Primary Examiner* — Tan Q Nguyen
(74) *Attorney, Agent, or Firm* — Armstrong Teasdale LLP

(57) ABSTRACT

A system and method for sensor management is provided. The system includes a plurality of sensors, and a sensor controller node communicatively coupled to the plurality of sensors, said sensor controller node configured to dynamically task data collections and communications with at least one of the plurality of sensors.

20 Claims, 2 Drawing Sheets

SYSTEMS AND METHOD FOR MANAGING SENSORS IN A VEHICLE

STATEMENT REGARDING FEDERALLY SPONSORED RESEARCH & DEVELOPMENT

The U.S. Government has certain rights in this disclosure as provided for by the terms of Contract No. OTA DTFACT-09-A80001, issued by the Federal Aviation Administration.

BACKGROUND OF THE DISCLOSURE

The field of the invention relates generally to sensor management including the energy, processing, digital data storage and communications resources associated with a sensor system. More specifically, it relates to the management of sensors that are part of a health management system.

Wireless sensing and processing systems generally reduce the weight and wiring costs associated with monitoring machinery. Such reductions can provide larger benefits depending on the associated application. For example, such reductions might be beneficial for use in aircraft and aerospace vehicles.

At least some wireless sensors used to monitor machinery can be powered with energy harvesting devices that are based on solar, thermo-electric and vibration effects. However, generally, such energy sources provide limited energy to a health management system. As such, the amount of data that may be collected to support health management analysis may be limited.

BRIEF DESCRIPTION OF THE DISCLOSURE

One aspect is directed to a system for sensor management. The system includes a plurality of sensors, and a sensor controller node communicatively coupled to the plurality of sensors, said sensor controller node configured to dynamically task data collections and communications with at least one of the plurality of sensors.

Another aspect is directed to an aircraft comprising a vehicle health management system. The vehicle health management system includes a plurality of sensors, and a sensor controller node communicatively coupled to the plurality of sensors, said sensor controller node configured to dynamically task data collections and communications with at least one of the plurality of sensors.

Another aspect is directed to a method for sensor management of a vehicle using a vehicle health management system. The method includes providing a plurality of sensors, communicatively coupling a sensor controller node to the plurality of sensors, and commanding data collection of at least one of the plurality of sensors.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

DETAILED DESCRIPTION

Figure 1:
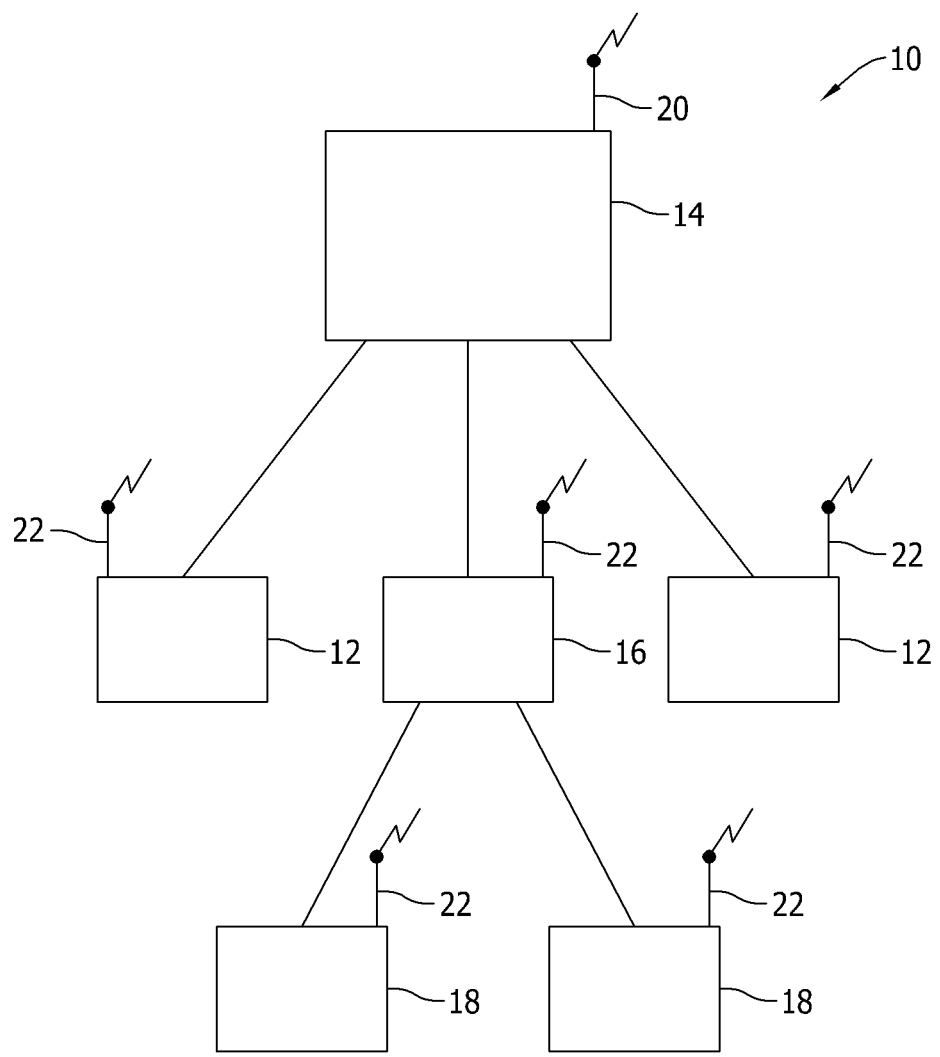
FIG. 1 is a schematic of an exemplary sensor management system.

FIG. 1 is a schematic of an exemplary sensor management system 10. In the exemplary embodiment, system 10 is installed within an aircraft (not shown) to support processes and decisions of various levels of criticality (support, mission or flight), where support critical refers to the maintenance and logistics processes and decisions. System 10 includes a plurality of sensors 12 that are communicatively coupled to a sensor controller node 14. In one embodiment, sensor controller node 14 is communicatively coupled to an area sensor node 16 that controls a plurality of area sensors 18. In one embodiment, area sensor node 16 and area sensors 18 are associated with particular components of the aircraft.

In the exemplary embodiment, sensor controller node 14 includes a wireless transceiver or communication device 20 that enables sensor controller node 14 to wirelessly communicate with one or more of sensors 12 and 18, and sensor node 16 that each include a wireless transceiver 22. In one embodiment, sensors 12 and 18, and sensor node 16 are each positioned within the vehicle at physically separate locations. Sensors 12 and 18, and sensor node 16 generally provide Integrated Vehicle Health Management (IVHM) data through various channels as described herein, including via a wire, wirelessly, or via fiber optic connection. In the exemplary embodiment, sensors 12 and 18, and sensor node 16 measure physical and/or environmental conditions, including but not limited to, temperature, vibration, pressure, sound, motion, or pollutants. In one embodiment, sensors 12 and 18, and sensor node 16 are low-power wireless sensors conforming to the IEEE 802.15.4 protocol. In one embodiment, sensors 12 and 18, and sensor node 16 are battery powered and/or powered by an ambient environment. In such an embodiment, an energy harvesting system is used to aid in acquiring power from the ambient environment. Alternatively, sensors 12 and 18, and sensor node 16 can be any sensor and be powered in any manner that facilitates sensor management as described herein.

In the exemplary embodiment, sensor controller node 14 is a Health Management (HM) system that is configured to collect and process data to determine and predict an operational status of a vehicle system (not shown). Node 14 includes a processor and controller configured to control sensors 12 and 18, and sensor node 16. In the exemplary embodiment, node 14 is configured to control sensor sleep modes, sampling rates, data collection window sizes, data history, power demands, costs for data acquisition costs for communicating data, and data acquisition.

Figure 2:
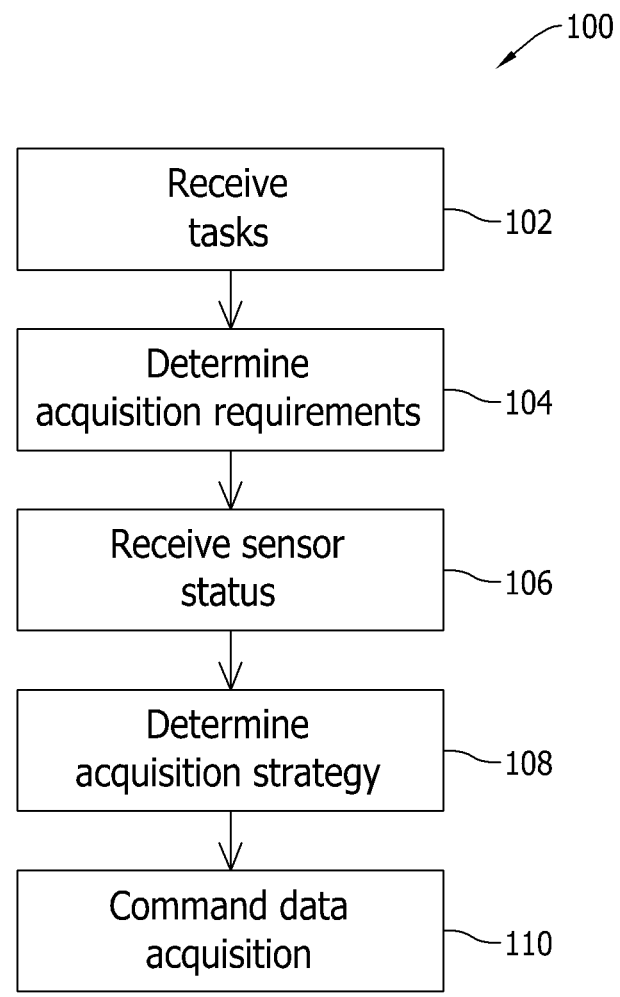
FIG. 2 is an exemplary method that may be implemented to manage sensors in a system, such as the system shown in FIG. 1.

FIG. 2 is an exemplary method 100 that may be implemented to manage sensors in a system, such as system 10 shown in FIG. 1. In the exemplary embodiment, tasks are received 102 by node 14. In one embodiment, tasks 102 include prognostic, diagnostic, failure detection/isolation, operational status and trending tasks for a vehicle with system 10. In one embodiment, received tasks 102 occur as scheduled events. Alternatively, received tasks 102 are event driven. For example, system 10 within an aircraft initiates a status check at take-off for information relating to air conditioning and monitors a cabin pressure at a pre-determined time interval (e.g., 5 minutes) during flight.

In the exemplary embodiment, node 14 determines 104 acquisition requirements of received tasks 102. For example, if during a landing event, an air conditioning temperature becomes variable, node 14 determines that a diagnostic of a sensor, air conditioning valves, and air cycle machine is required and initiates the diagnostic or alters a user to initiate a diagnostic, resulting in a sensor status. In the exemplary embodiment, sensor status is received 106 by node 14. In one embodiment, sensors 12 and 18, and sensor node 16 communicate information from individual sensors including, but not limited to, energy limitations, remaining power capacity, voltage, temperature, and data acquisition options. Alternatively, sensors 12 and 18, and sensor node 16 communicate any information from individual components that facilitates sensor management as described herein.

In the exemplary embodiment, node 14 determines 108 an acquisition strategy for obtaining sensor information on various components based on determined 104 acquisition requirements and received 106 sensor data. In one embodiment, determination 108 includes a scan and event window sampling mode. In the scan and event window sampling mode, a portion (e.g., half) of the available energy of a sensor is utilized for scanning and/or sampling of a signal for threshold comparisons. If a threshold is met from the scanning and/or sampling, the remaining energy of the sensor is used for measurements, transmittal, and/or storage of the required event data. For example, pressure may be scanned such that half of the available energy of the sensor is utilized to determine if a pressure reading exceeds a threshold. If a threshold is exceeded, the remaining energy of the sensor is utilized for "full-up" required processing, data transmittal and/or storage for failure diagnostic and/or prognostic reporting to a higher level node. In one embodiment, scanning is performed on an individual sensor. Alternatively, scanning of an area sensor 18 can be performed on an area sensor node 16 that is in communication with area sensor 18.

In one embodiment, determination 108 includes a trending or scan only mode. In the trending mode, all of the available power of a sensor is used for periodic processing, data transmittal, and/or storage for domain applications. In one embodiment, the trending mode is utilized as trending in accordance with device wear-out. In the trending mode, only the needed number of samples in a period of time to enable data normalization is required. In such an embodiment, the number of samples needed changes depending on the current remaining useful life (RUL) estimate that is performed by node 14. If the RUL of a component is approaching zero, all higher sampling may be utilized for precise RUL reporting per higher needed sampling intervals required for specific missions. Alternatively, a RUL may be high, requiring only a portion of available energy to be utilized for the data acquisition that is commanded 110 by node 14.

In another embodiment, determination 108 includes a combination of the scan and event window sampling mode and the trending mode, known as a combination mode. In such an embodiment, if a sensor scan shows a key parametric value to be well below a threshold, a scan only mode is performed for trending on temperature and/or pressures. Such a mode enables more accurate RUL calculations. If a sensor scan shows key parametric values to be nearing a threshold, the wireless sensor may utilize half of its power for trending and the remaining half for the scan and event window sampling mode as is appropriate.

In another embodiment, determination 108 may be performed in accordance with the RUL of subject components being monitored by sensors. In one embodiment, determination 108 may be performed dependent on a base station's availability for supplying power and/or a base station's availability for supplying data. Determination 108 may be performed as a power adaptation per mission and/or flight. For example, a shorter mission and/or flight allows for an increase of sensor trending because less energy needs to be used throughout the mission and/or flight. In one embodiment, determination 108 is performed as a result of user or automated base station settings.

In the exemplary embodiment, when an acquisition strategy has been determined 108, data acquisition is commanded 110 by node 14. In the exemplary embodiment, command 110 includes a dynamic tasking of data collections and communications with sensors 12 and 18, and sensor node 16. In one embodiment, commanding 110 of data collection can be based as a result of events including, but not limited to, a flight regime, an in-flight event, a diagnostic strategy, and a predetermined event (e.g., landing) associated with a platform (e.g., aircraft). In one embodiment, node 14 wakes a sensor and commands 110 the sensor to provide information on a desired associated component. Allowing sensors to provide sensor data on command enables system 10 to avoid interference among sensors and to prevent data collisions throughout a vehicle. In one embodiment, data acquisition is commanded 110 to acquire data to resolve a diagnostic ambiguity.

In one embodiment, determination 108 incorporates aircraft operation and health management data needs. For example, node 14 may be aware of the last reported health assessment of a particular component. With this information, node 14 may determine that a new assessment of the component (e.g., landing gear component) is unnecessary on the next landing, and command 110 the sensor to sleep for a period of time related to an anticipated flight schedule. Alternatively, node 14 may determine that an updated assessment of the sensor is desired and command 110 the sensor to sleep for a period of time shorter than the expected time, prior to landing. In one embodiment, upon passage of this period of time, node 14 commands 110 further sleep periods to the sensor based on further refined estimates of an expected time to landing. In one embodiment, starting one minute or less before anticipated landing, the sensor is commanded to wake up every second to listen for a "weight on wheels" indication from node 14, upon receiving this indication, a sampling window of the sensor is initiated.

Further, although the present disclosure is described with respect to processors and computer programs, as will be appreciated by one of ordinary skill in the art, the present disclosure may also apply to any system and/or program that is configured to determine (diagnosis) and/or predict (prognosis) the health of a vehicle system or subsystem, and enable the mitigation of adverse events during operation. For example, as used herein, the term processor is not limited to just those integrated circuits referred to in the art as processors, but broadly refers to computers, processors, microcontrollers, microcomputers, programmable logic controllers, application specific integrated circuits, and other programmable circuits. The processor may be part of a computer that may include a device, such as; a floppy disk drive or compact disc-read-only memory (CD-ROM) drive, for reading data from a computer-readable medium, such as a floppy disk, a CD-ROM, a magneto-optical disk (MOD), or a digital versatile disc (DVD).

Exemplary embodiments of sensor management systems for use in the aviation industry are described in detail herein. The disclosed sensor management systems may optimize the value of the data acquired from sensors in a sensor network by using the health management system to actively control data collection and processing requests. Knowledge of the data requirements to support diagnostics and prognostics is present in many health management systems. This knowledge may be used to optimize the data acquisition task performed by the sensor network. For example, the systems described herein may provide condition based maintenance and increase availability for less cost. The sensor management systems described herein may also provide a method to control energy and data acquisition resources to provide better diagnostics and prognostics given limited resources such as energy, processing, data storage and communications bandwidth, thus reducing support costs. The systems described herein may provide integration of health management and control to acquire the right data at the right time while expending minimal energy.

Although the foregoing description contains many specifics, these should not be construed as limiting the scope of the present disclosure, but merely as providing illustrations of some of the presently preferred embodiments. Similarly, other embodiments of the disclosure may be devised which do not depart from the spirit or scope of the present disclosure. Features from different embodiments may be employed in combination. The scope of the disclosure is, therefore, indicated and limited only by the appended claims and their legal equivalents, rather than by the foregoing description. All additions, deletions and modifications to the disclosure as disclosed herein which fall within the meaning and scope of the claims are to be embraced thereby.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A vehicle health management system for sensor management comprising:
    a plurality of sensors; and
    a sensor controller node communicatively coupled to said plurality of sensors, said sensor controller node configured to identify a sensor status associated with at least one sensor of said plurality of sensors, determine an acquisition strategy for obtaining sensor information based on the sensor status, and command the at least one of sensor to acquire data based on the acquisition strategy.

2. A vehicle health management system in accordance with claim 1, wherein said plurality of sensors are wireless sensors, and are communicatively coupled to the sensor controller node wirelessly.

3. A vehicle health management system in accordance with claim 1, wherein said sensor controller node is further configured to determine the acquisition strategy based on energy limitations associated with at least one of said plurality of sensors.

4. A vehicle health management system in accordance with claim 1, wherein said sensor controller node is further configured to determine the acquisition strategy based on a diagnostic strategy associated with said system.

5. A vehicle health management system in accordance with claim 1, wherein said sensor controller node is further configured to determine the acquisition strategy based on at least one of a flight regime, an in-flight event, and a pre-determined event associated with a platform on which said system is deployed.

6. A vehicle health management system in accordance with claim 1, wherein said sensor controller node is further configured to determine the acquisition strategy based on management of usage of said node and said plurality of sensors based on energy limitations of an energy harvesting system associated with said system.

7. A vehicle health management system in accordance with claim 1, further comprising:
    at least one area sensor; and
    an area sensor node, said area sensor node in communication with said at least one area sensor and said sensor controller node.

8. An aircraft comprising:
    a vehicle health management system comprising:
        a plurality of sensors; and
        a sensor controller node communicatively coupled to said plurality of sensors, said sensor controller node configured to identify a sensor status associated with at least one sensor of said plurality of sensors, determine an acquisition strategy for obtaining sensor information based on the sensor status, and command the at least one of sensor to acquire data based on the acquisition strategy.

9. An aircraft in accordance with claim 8, wherein said plurality of sensors are wireless sensors, and are communicatively coupled to the sensor controller node wirelessly.

10. An aircraft in accordance with claim 8, wherein said sensor controller node is further configured to determine the acquisition strategy based on energy limitations associated with at least one of said plurality of sensors.

11. An aircraft in accordance with claim 8, wherein said sensor controller node is further configured to determine the acquisition strategy based on a diagnostic strategy associated with said system.

12. An aircraft in accordance with claim 8, wherein said sensor controller node is further configured to determine the acquisition strategy based on at least one of a flight regime, an in-flight event, and a pre-determined event associated with a platform on which said system is deployed.

13. An aircraft in accordance with claim 8, wherein said sensor controller node is further configured to determine the acquisition strategy based on management of usage of said node and said plurality of sensors based on energy limitations of an energy harvesting system associated with said system.

14. An aircraft in accordance with claim 8, further comprising:
    at least one area sensor; and
    an area sensor node, said area sensor node in communication with said at least one area sensor and said sensor controller node.

15. A method for sensor management of a vehicle using a vehicle health management system, said method comprising:
    providing a plurality of sensors;
    communicatively coupling a sensor controller node to the plurality of sensors;
    identifying a sensor status associated with at least one sensor of the plurality of sensors;
    determining an acquisition strategy for obtaining sensor information based on the sensor status; and commanding the at least one sensor to acquire data based on the acquisition strategy.

16. A method in accordance with claim 15, wherein determining an acquisition strategy further comprises determining the acquisition strategy based on energy limitations associated with at least one sensor.

17. A method in accordance with claim 15, wherein determining an acquisition strategy further comprises determining the acquisition strategy based on a diagnostic strategy associated with the health management system.

18. A method in accordance with claim 15, wherein determining an acquisition strategy further comprises determining the acquisition strategy based on at least one of a flight regime, an in-flight event, and a pre-determined event associated with a platform on which the health management system is deployed.

19. A method in accordance with claim 15, wherein determining an acquisition strategy further comprises determining the acquisition strategy based on management of usage of the sensor controller node and the plurality of sensors based on energy limitations of an energy harvesting system associated with the health management system.

20. A method in accordance with claim 15, wherein providing a plurality of sensors further comprises providing a plurality of wireless sensors.

\* \* \* \* \*